United States Patent
Beynon et al.

(10) Patent No.: US 8,296,785 B2
(45) Date of Patent: Oct. 23, 2012

(54) PROVIDING LINKS BETWEEN APPLICATION PROGRAMS

(75) Inventors: Margaret Ann Beynon, Woking (GB); Kevin Christopher Brown, Eastleigh (GB); Graham Castree Charters, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 1032 days.

(21) Appl. No.: 12/239,856

(22) Filed: Sep. 29, 2008

(65) Prior Publication Data

US 2009/0100447 A1    Apr. 16, 2009

(30) Foreign Application Priority Data

Oct. 12, 2007    (EP) .................................... 07118357

(51) Int. Cl.
*G06F 3/00*    (2006.01)
*G06F 11/00*    (2006.01)
*G06F 9/44*    (2006.01)

(52) U.S. Cl. ........................... 719/329; 714/46; 717/106
(58) Field of Classification Search ........................ None
See application file for complete search history.

(56) References Cited

U.S. PATENT DOCUMENTS

| | | | |
|---|---|---|---|
| 6,026,410 A | 2/2000 | Allen et al. | |
| 6,266,788 B1 | 7/2001 | Othmer et al. | |
| 6,574,792 B1 | 6/2003 | Easton | |
| 2005/0120011 A1 | 6/2005 | Dehlinger et al. | |
| 2005/0278585 A1* | 12/2005 | Spencer | 714/46 |
| 2006/0277523 A1* | 12/2006 | Horen et al. | 717/106 |
| 2007/0038978 A1* | 2/2007 | Meijer et al. | 717/106 |
| 2009/0328033 A1* | 12/2009 | Kohavi et al. | 718/1 |

* cited by examiner

*Primary Examiner* — Andy Ho
*Assistant Examiner* — Tuan Dao
(74) *Attorney, Agent, or Firm* — Cerald R. Woods; Jeanine S. Ray-Yarletts

(57) ABSTRACT

Links are established between data elements common to different application programs to make it easier for a user to perform an action in one application program using data available in another application program. Data elements are identified in a first data set for a first application program. One or more performable actions is associated with each identified data element. Common or matching data elements in a second data set for a second application are identified. When a user selects one of the matching data elements in the second data set, a selectable list of actions is presented to enable performance of a selected action from within the first application program in relation to the data element selected in the second application program.

12 Claims, 7 Drawing Sheets

| Link Data | | |
|---|---|---|
| Data Element | Provider | Action |
| Value 1 | Application 2 | Action 1, 3 |
| Value 1 | Application 3 | Action 2 |
| Value 2 | Application 4 | Action 5, 6 |
| Value 2 | Application 2 | Action 3, 2 |
| Value 2 | Application 3 | Action 1 |
| Value 3 | Application 2 | Action 2, 3 |
| Value 3 | Application 3 | Action 3, 4 |
| Value 3 | Application 4 | Action 1, 2 |
| Value 4 | Application 4 | Action 2, 5 |
| Value 5 | Application 2 | Action 3 |
| Value 5 | Application 4 | Action 4, 6 |
| Value 6 | Application 3 | Action 5, 7 |
| Value 7 | Application 2 | Action 6, 8 |
| Value 7 | Application 3 | Action 4 |
| Value 8 | Application 4 | Action 5 |
| Value 8 | Application 2 | Action 6, 9 |
| Value 9 | Application 4 | Action 4 |
| Regular Expression 1 | Application 2 | Action 5 |
| Regular Expression 2 | Application 3 | Action 6 |
| Regular Expression 3 | Application 4 | Action 5 |

Figure 3

PROVIDING LINKS BETWEEN APPLICATION PROGRAMS

BACKGROUND

The present invention relates to providing links between application programs.

Computer systems commonly provide a selection of application programs for users, such as database applications, email, chat or instant messaging applications, code editors, version control systems and word processing or presentation applications.

If a user working in a first application needs functionality provided by a second application, the user will need to break from the first application to open or launch the second application. Furthermore, if the user needs to perform an operation in the second application using the data from the first application, then the user may need to perform a cut and paste operation from the first application. Alternatively, the user may locate the required functionality in the second application and manually enter the required data from the first application.

One problem with these approaches is that the transfer of the data between applications is prone to errors in typing or user recall of the required data. Furthermore, if the required functionality is not compatible with the entered data, further applications may need to be launched and searched. Such processes are prone to errors, waste a user's time and disrupt a user's thought processes.

SUMMARY

The invention may be embodied as a method in which the first action is to identify a set of data elements in a first data set for a first application problem. One or more actions is associated with each identified data element with each action being performable from which the first application program in relation to the associated data element. Data elements that are common to the identified set of data elements for the first application program and to a second data set for a second application program are identified. When a user selects one of the common data elements in the second data set, a selectable list of associated actions is presented so that an action selected from within the first application program may be performed within the second application program in relation to the selected data element common to both programs.

The invention may also be embodied as an apparatus and as a computer program product.

BRIEF DESCRIPTION OF THE SEVERAL VIEWS OF THE DRAWINGS

Embodiments of the invention will now be described, by way of example only, with reference to the accompanying drawings in which:

FIG. 3 is a table illustrating data used on the software system of FIG. 2;

DETAILED DESCRIPTION

Figure 1:
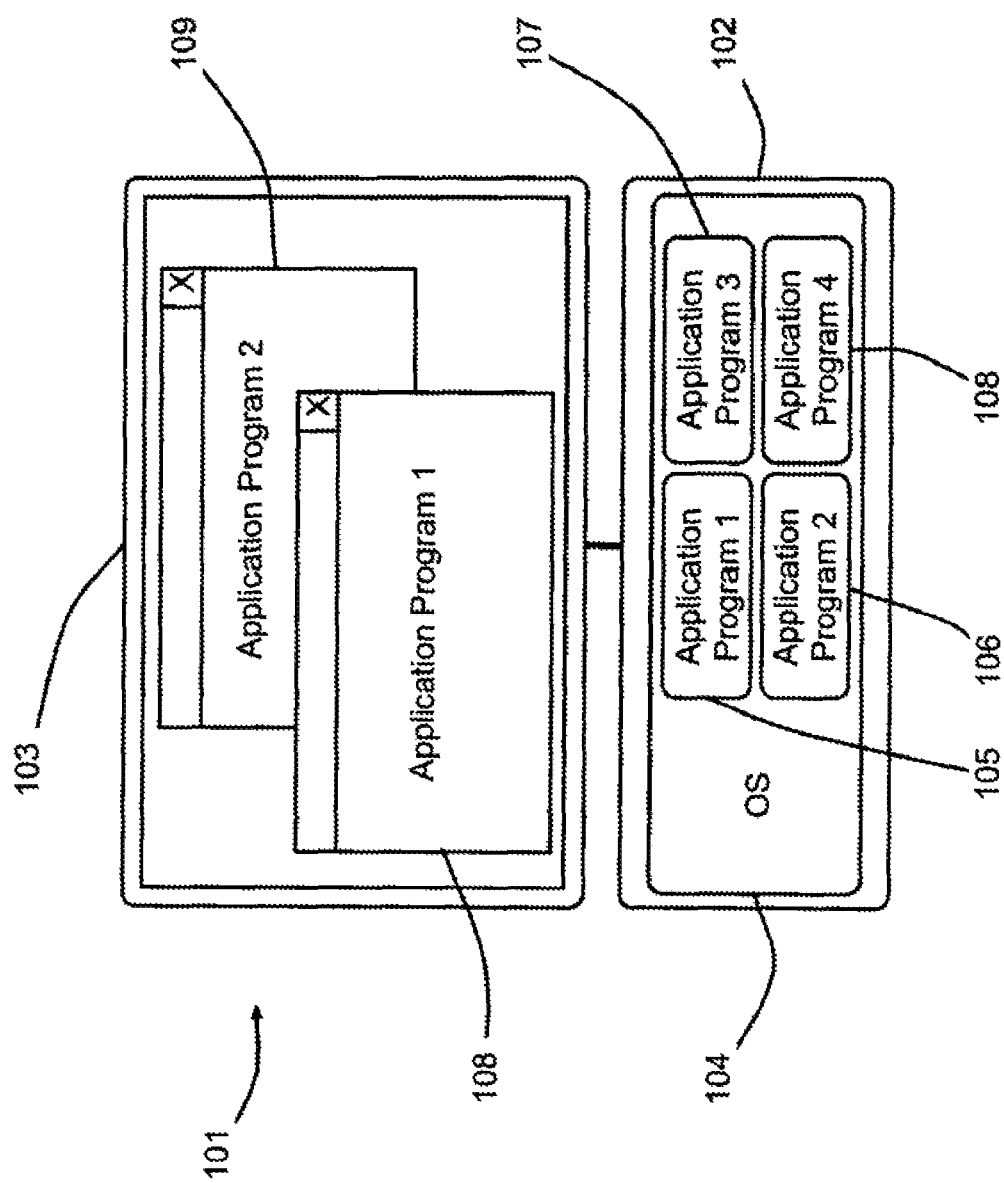
FIG. 1 is a schematic illustration of a computer.

As will be appreciated by one skilled in the art, the present invention may be embodied as a system or apparatus, a method or a computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer usable or computer readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction execution system, apparatus, or device. The computer usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

With reference to FIG. 1, a computer system 101 comprises a computer 102 connected to a display 103 and user input devices in the form of a keyboard and mouse (not shown). The computer is installed with an operating system (OS) 104 arranged to provide a processing platform for a first, second, third and fourth application programs 105, 106, 107, 108, assumed (for purposes of illustration) to take the form of a text editor application program, email client application program, database client application program and a version control system client application program respectively. The application programs display respective windows 108, 109 on the display 103 (only two application program windows are shown). Each application program 105, 106, 107, 108 is associated with a respective data set, which comprises the data created and utilized by the respective application program. The data elements of each respective data set may include words, numbers symbols and expressions that make up current open documents, stored emails or database data.

Figure 2:
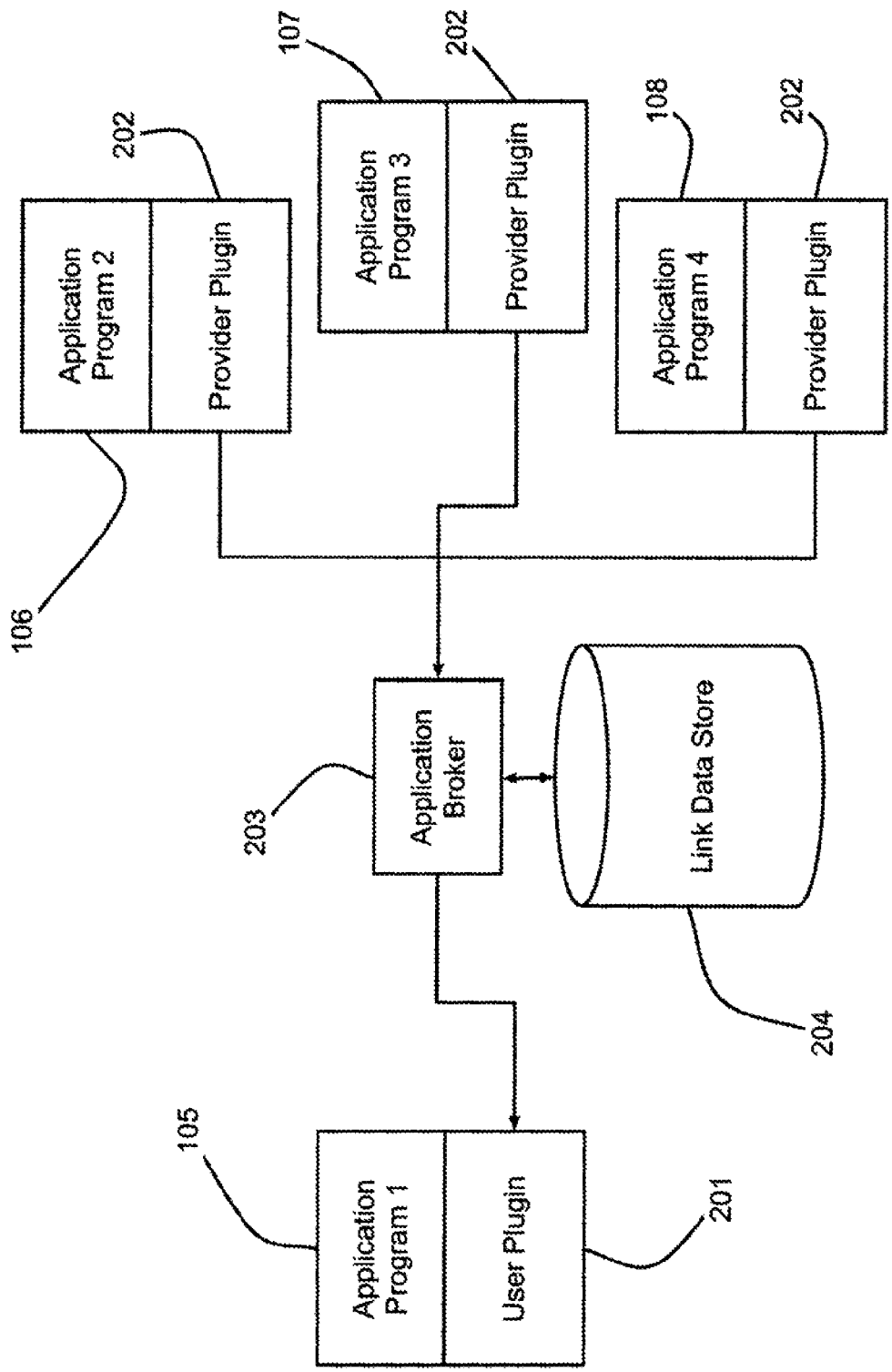
FIG. 2 is a schematic illustration of a software system provided on the computer of FIG. 1.

FIG. 2 shows the architecture of the software in the computer system 101 in further detail. The first application program 105 further includes a user plugin 201 and each of the second, third and fourth application programs 106, 107, 108 further includes a provider plugin 202. The plugins 201, 202 communicate with an application broker 203, which has an associated link data store 204. Each provider plugin 202 is programmed to identify a predetermined set of data elements and to associate each selected data element with one or more actions or processes within the application. The data elements may be identified as specific data element values or generically by means of regular expressions. Specific data element values are drawn from the data set for the application program associated with the provider plugin 202. For example, in the case of an email client application program, values from the address and subject fields of emails may be selected for inclusion in the set of data elements. Regular expressions are templates or patterns arranged to match a desired set of data element values. For example, given the email application program, the plugin 202 may be provided with the following regular expression, which is arranged to match email addresses:

\b[a-zA-Z0-9._%+-]+@[a-zA-Z0-9.-]+\.[a-zA-Z]{2,4}\b

Such regular expressions may be included in the set of data elements. As noted above, one or more actions are also associated with each data element in the set of data elements defined by the provider plugin 202. In the example of an email client application program, an action may be to search for emails containing the associated data element value or to open a new message with the data element value inserted as an appropriate part of the new message, such as the intended recipient's address. As will be understood by those skilled in the art, the particular data elements extracted and the associated action are dependent on the given application program.

The provider plugins 202 are arranged to pass their collected sets of data elements and an identification of the associated actions to the application broker 203 which stores and collates the sets of data in the link data store 204. A generalized version of the link data 301 thus stored in the link data store 204 is shown in the table of FIG. 3. Each entry in the link data 301 includes a data element 302, an identification 303 of the application from whose data set the data element originates and the action or actions 304 associated with the given data element 301 within the associated application 303.

Figure 4A:
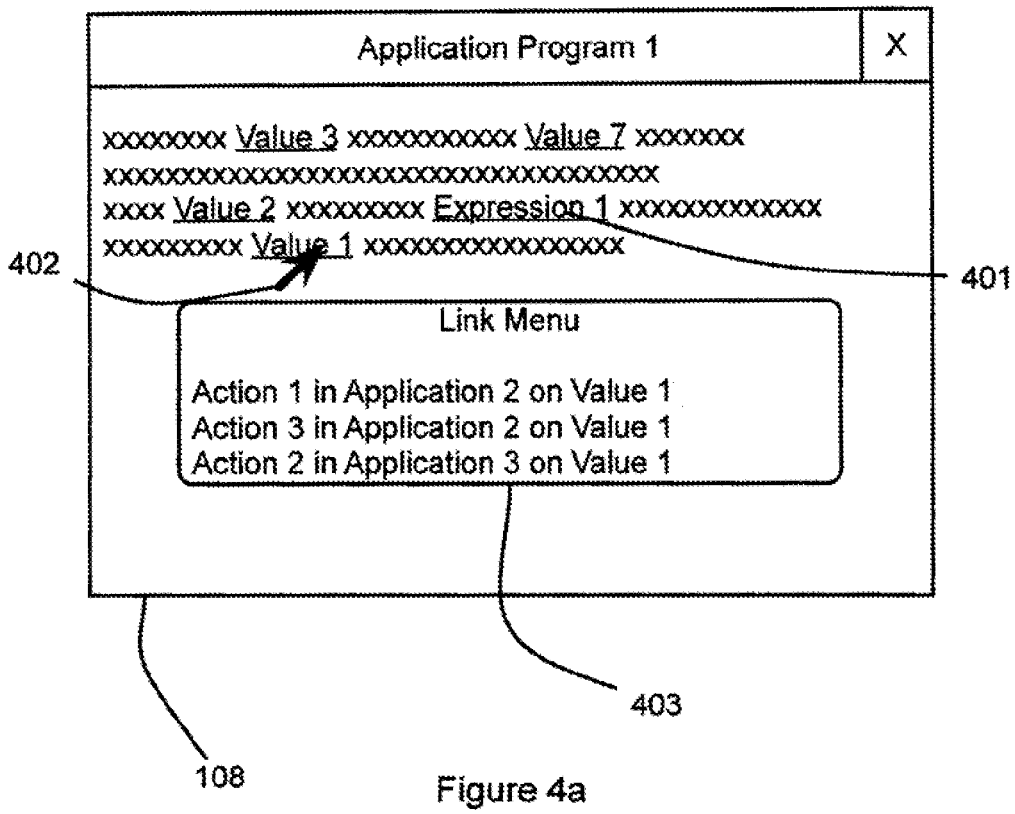
FIGS. 4a and 4b are illustrated screen shots showing menus provided in the software system of FIG. 2.

The application broker 203 is arranged to pass a consolidated set of link data 301 to the user plugin 201. In response to the receipt of the link data 301, the user plugin is arranged to identify any corresponding terms in the data set of the first application program. Corresponding terms are data elements that have the same value as any one of the values defined in the link data 301 or data element values that match any of the regular expressions defined in the link data 301. For example in FIG. 4a, one data element value has matched "Expression 1" from the link data 301. Any corresponding terms thus identified are tagged.

When the first application displays data including one or more of the tagged data elements, the user plugin 201 is arranged to mark 401 the tagged elements such as by coloring and underlining the text of the data element. The marking of a tagged element indicates to a user that the marked data element is linked to one or more corresponding data elements in one or more of the other application programs 106, 107, 108. When a user selects a marked data element with a pointer 402 and enters a predetermined command via the keyboard or mouse, the user plugin is arranged to display a link menu 403. The link menu 403 includes a selectable list of actions that may be performed on the selected data element in the one or more of the application programs 106, 107, 108. The list of application programs is determined by the user plugin 201 from the link data 301. In response to user selection of one of the actions from the link menu 403, the user plugin 201 is arranged to communicate with the provider plugin 202 for the corresponding application. In the present example, it is assumed the user has selected an action within the second application program 106.

Figure 4B:
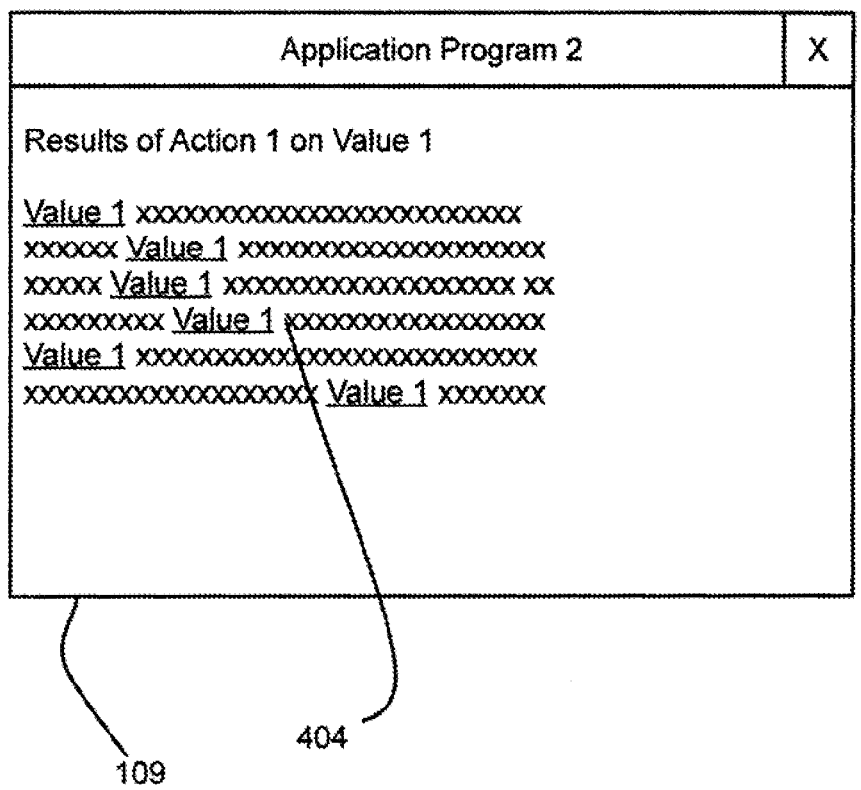

With reference to FIG. 4b, in response to the communication from the user plugin 201, the provider plugin 202 is arranged to display the window 109 for the second application 106 and to present the results of the performance of the specific action within the second application program 106 with respect to the data element originally selected from in the first application 105. For example, if the data element "Value 1" is an email address and the action "Action 1" is an email address search, then selecting "Value 1" and "Action1" in the first application 105 will redirect the user into the second application and search all of the occurrences of the address in the second application 106. Thus the first application program 105 is linked to the other application programs 106, 107, 108 via corresponding data element values. The linking makes it easier for a user to move easily from one application to perform an action in a second application using a data element from the first application.

Figure 5A:
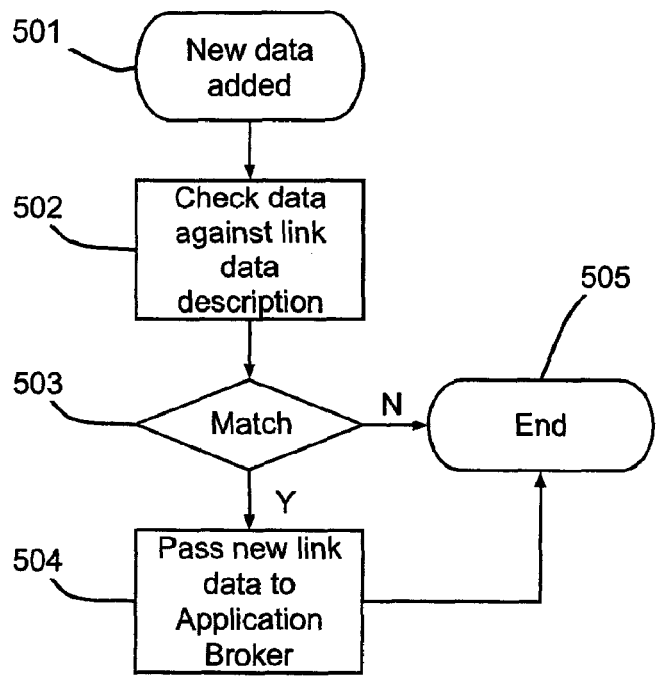
FIGS. 5a, 5b, 5c, 6a and 6b are flow charts illustrating processing performed in the software system of FIG. 2.

The processing performed by a provider plugin 202 when identifying data elements within its data set to be provided to the application broker 203 will now be described in further detail with reference to the flow chart of FIG. 5*a*. At step 501, the processing in the plugin 202 is initiated in response to the initialization of the corresponding application program or the addition of data to the data set and processing moves to step 502. At step 502, the new data is checked against the link data description programmed into the plugin 202. The link data description defines which of the data elements of the application program should be passed to the application broker 203 and also defines the actions or processes to be associated with the respective data elements. Processing then moves to step 503. If any matches have been found, processing moves to step 504 where the matched data elements, their associated actions, and an identification of the application program, are sent to the application broker 203. Processing then moves to step 505 where processing ends. If at step 503 no matches have been identified, then processing moves directly to process-ending step 505.

Figure 5B:
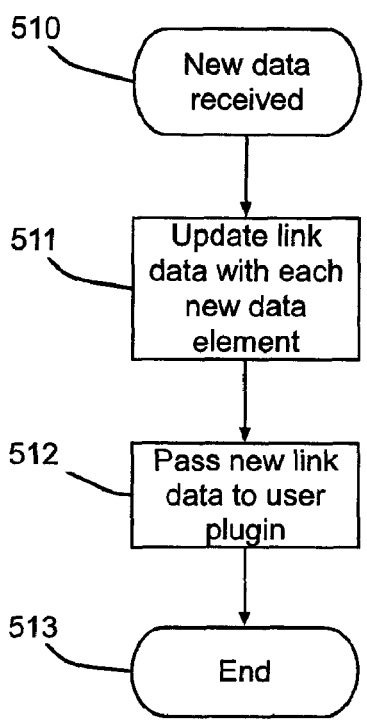

The processing performed by the application broker in response to the receipt of data from a provider plugin 202 will now be described further with reference to the flow chart of FIG. 5*b*. At step 510, processing is initiated by the receipt of new data from one of the provider plugins 202. Processing then moves to step 511 where the new data is added to the link data 301, either updating existing entries for a given data element or adding new entries where new data elements are received. Processing then moves to step 512 where the new data elements are passed to the user plugin 201. Processing then moves to step 513 where this part of the processing of the provider plugin 202 ends.

Figure 5C:
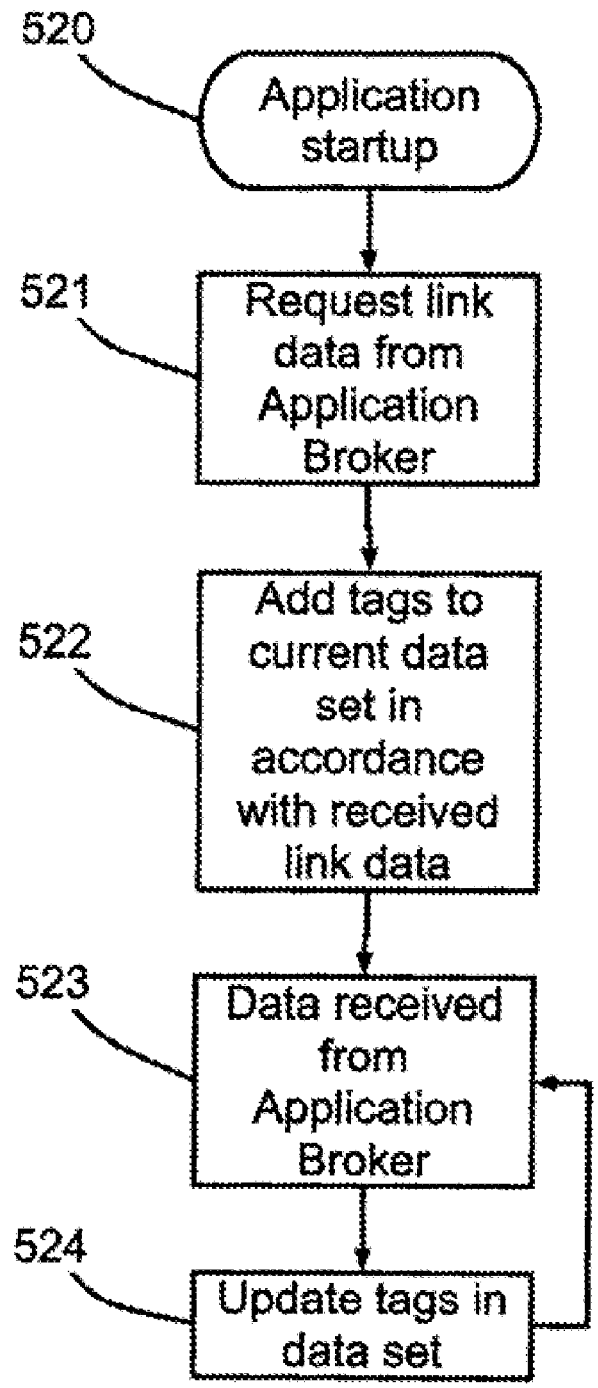

The processing performed by the user plugin 201 in response to the receipt of data from the application broker 203 will now be described in further detail with reference to the flow chart of FIG. 5*c*. At step 520, in response to the initialization of the corresponding application program, processing for the user plugin 201 is initialized and moves to step 521. At step 521, a request for the link data 301 is sent to the application broker 203. Processing then moves to step 522 to await receipt of the link data 301 from the application broker 203. Once the link data is received, the data set for the application is searched for corresponding data elements and any matched data elements tagged. Further, as the data set for the application is updated with further data elements, for example during the editing of a text document, the data set is rechecked against the received link data 301 and any further matched data elements tagged. As noted above, the tags enable the corresponding data elements to be displayed appropriately. Processing then moves to step 523 to await further data element updates from the application broker 203. When such updates are received, processing moves to step 524 where the tags in the data set are updated in accordance with the received data elements. Processing then returns to step 523 to await further updates.

Figure 6A:
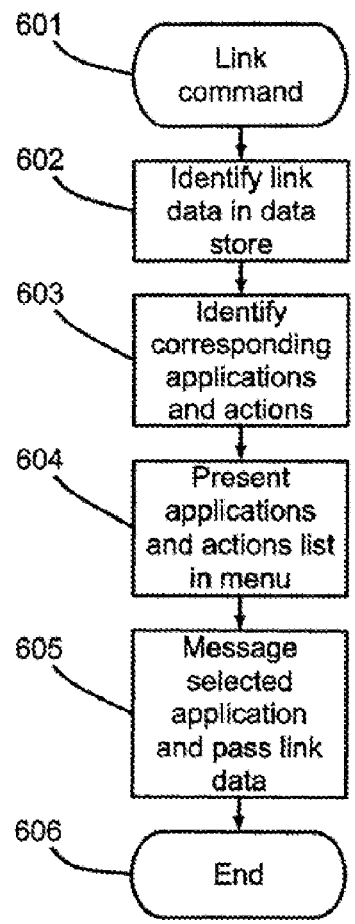

The processing performed by the user plugin 201 in response to the user selection of a marked data element or link displayed in the first application window 108 will now be described further with reference to the flow chart of FIG. 6*a*. At step 601, processing is initiated in response to a link command being entered by a user in relation to a selected data element in the data set, and processing moves to step 602. At step 602, the link data 301 in the data store 204 for the selected data element is identified and processing moves to step 603. At step 603, the application programs corresponding to the identified data element are identified and processing moves to step 604. At step 604, the list of actions is presented to the user as a selectable list in the link menu 403 and processing moves to step 605. At step 605, in response to user selection of one of the listed actions, the user plugin 201 communicates the selected data element value and action to the provider plugin 202 for the application program associated with the selected action. Processing then moves to step 606 where this part of the processing of the user plugin 201 ends.

Figure 6B:
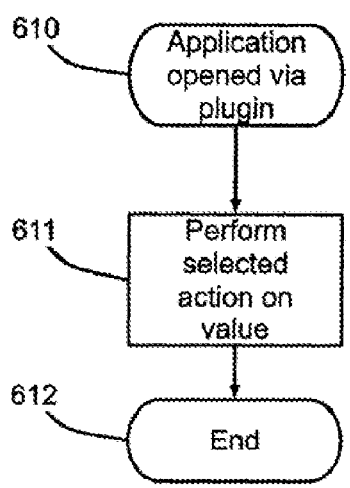

The processing performed by a provider plugin 202 in response to a communication from the user plugin 201 indicating the selection of a corresponding link will now be described in further detail with reference to FIG. 6*b*. At step 610, processing is initiated in response to a communication of a data element value and an associated action from the user plugin 201 and processing moves to step 611. At step 611 the selected action is performed with the selected data element value within the associated application program. Processing then moves to step 612 where this part of the processing of the provider plugin 202 ends.

In another embodiment one or more of the application programs are provided with a link plugin that provides the functions of both the user and provider plugins as described above. This enables links to be provided both ways between data elements of two or more application programs.

The communication between the plugins and the application broker may be provided over a network. Furthermore, the data sets utilized by each application program may be shared by a number of application programs. The functionality of the plugins described above may be provided by any suitable add-on program for adding functionality to an application program or may be an integral part of the application program. Furthermore, the data elements definition list for each plugin, which defines the data elements in a given data set that can be linked to, may be a global set of definitions for a group of applications or a separate set for each application. The data element lists may be created manually or by a suitable parser arranged to extract suitable elements from a data set.

In another embodiment, the application broker is arranged to extract the link data from the application programs and their corresponding data sets. In effect, the application broker acts as a search engine and the link data is provided in the form of a search index accessed by the user plugin functionality.

In a further embodiment, in response to the deletion of the last or only example of a given data element from a data set, the corresponding entry in the link data is also deleted along with the tags entered in each application program data set that are no longer valid. In another embodiment, the data tags within a data set are temporary in that they are removed each time the corresponding application is shut down and are refreshed from the link data store on subsequent start up of the application. The tags may be stored separately from the data set.

In a further embodiment a complete set of link data is stored locally to each application program with updates or refreshes being broadcast to all relevant plugins either from a central point or directly from each provider plugin.

In another embodiment the application broker or plugins are arranged to have access to any passwords required for access or opening of one or more of the applications programs participating in the system so as to enable the automatic opening of the appropriate application programs.

In a further embodiment new data added to the link data store is only passed to the appropriate plugins when a predetermined threshold is exceeded. The threshold may be a time period having elapsed or a certain quantity of data having been updated. Such threshold mechanisms may be applied to the supply of link data updates from application programs.

In another embodiment, a facility is provided to enable user selected data elements to be added into the link data. The facility enables a user to select a data element that may not have been already identified in the link data, and to run a data element query to match it in one of the data sets of applications in the system. Similarly, a data element may be selected by a user and added to the data set for the application program from within which the selection was made. A set of default actions is also provided for each application with which such user selected data elements may be identified. Thus a user is able to self-select data elements and an associated action.

It will be understood by those skilled in the art that there may be cases where coloring or underlining of tagged data elements is impractical. In this case, the highlighting or underlining may only be visible if a portion of the data element text is selected or the cursor is located within the text of the data element.

It will be understood by those skilled in the art that other identification mechanisms than the data element value and regular expression mechanisms described above may be utilized. For example, a piece of code providing a matching function may be provided for use by the plugins in identifying candidate data elements.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be equally clear to one of skill in the art that all or part of a logic arrangement according to the preferred embodiments of the present invention may suitably be embodied in a logic apparatus comprising logic elements to perform the steps of the method, and that such logic elements may include components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

Having thus described the invention of the present application in detail and by reference to preferred embodiments thereof, it will be apparent that modifications and variations are possible without departing from the scope of the invention defined in the appended claims.

What is claimed is:

1. A computer implemented method comprising:
   receiving a data set from each of at least a first application program and a second application program running in a computer system, each received data set comprising at least one data element and one or more associated actions that are performed on said data element within the application program from which said data set is received;
   storing each received data set as one or more data records in a link data store memory device, each record comprising a data element, an identity of the application program from which the data set was received and each associated action that is performed on the data element within the identified application program;
   sending a consolidated set of stored data records stored in said link data store memory device to each application program from which a data set was received;
   receiving an input from one of said application programs identifying a data element common to said one application program and to said second application program and specifying an action that is performed on said identified data element from within said second application program; and
   linking said one application program and said second application program to cause the specified action to be initiated within said second application program by a user of said one application program.

2. A computer implemented method as set forth in claim 1 further comprising returning the result of said specified action performed in the second application program to the first application program.

3. A computer implemented method as set forth in claim 2 further comprising:
   receiving data sets from three or more application programs;
   storing a data set received from each of said three or more application programs in the link data store memory device; and
   sending a consolidated set of stored data records stored in said link data store memory device to each of said three or more application programs.

4. A computer implemented method as set forth in claim 2 further comprising:
   upon receiving an input identifying a data element, performing a search for selectable actions that are performed on said data element in all application programs other than the application program from which the input was received; and
   providing a selectable set of actions that are performed on said data element.

5. A computer-implemented apparatus for creating inter-program links between application programs running in a computer system, said apparatus comprising:
   a first receiving component for receiving a data set from each of at least a first application program and a second application program running in the computer system, each received data set comprising at least one data element and one or more associated actions that are performed on said data element within the application program from which said data set is received;
   a data link store memory hardware device for storing each received data set as one or more data records in a link data store memory hardware device, each record comprising a data element, an identity of the application program from which the data set was received and each associated action that is performed on the data element within the identified application program;
   a sending component for sending a consolidated set of stored data records stored in said link data store memory device to each application program from which a data set was received;

a second receiving component receiving an input from one of said application programs identifying a data element common to said one application program and to said second application program and specifying an action that is performed on said identified data element from within said second application program; and a control component for linking said one application program and said second application program to cause the specified action to be initiated within said second application program by a user of said one application program.

6. A computer implemented apparatus as set forth in claim 5 further comprising a control component for returning the result of said specified action performed in the second application program to the first application program.

7. A computer implemented apparatus as set forth in claim 6 wherein said first receiving component receives data sets from three or more application programs, said data link memory devices stores a data set received from each of said three or more application, and said sending component sends a consolidated set of stored data records stored in said link data store memory device to each of said three or more application programs.

8. A computer implemented apparatus as set forth in claim 6 further comprising:

processing logic for, upon receiving an input identifying a data element, performing a search for selectable actions that are performed on said data element in all application programs other than the application program from which the input was received; and selection logic for providing a selectable set of actions that are performed on said identified data element.

9. A computer program product comprising a non-transitory recording medium embodying computer program instructions that when loaded into and executed by a computer cause the computer to create inter-program links among application programs running in a computer system by performing a method comprising:

receiving a data set from each of at least a first application program and a second application program running in a computer system, each received data set comprising at least one data element and one or more associated actions that are performed on said data element within the application program from which said data set is received;

storing each received data set as one or more data records in a link data store memory device, each record comprising a data element, an identity of the application program from which the data set was received and each associated action that is performed on the data element within the identified application program;

sending a consolidated set of stored data records stored in said link data store memory device to each application program from which a data set was received;

receiving an input from one of said application programs identifying a data element common to said one application program and to said second application program and specifying an action that is performed on said identified data element from within said second application program; and linking said one application program and said second application program to cause the specified action to be initiated within said second application program by a user of said one application program.

10. A computer program product as set forth in claim 9 further comprising additional program instructions for causing the computer to return the result of said specified action performed in the second application program to the first application program.

11. A computer program product as set forth in claim 10 further comprising additional program instructions for causing the computer to:

receive data sets from three or more application programs;

store a data set received from each of said three or more application programs in the link data store memory device; and send a consolidated set of stored data records stored in said link data store memory device to each of said three or more application programs.

12. A computer program product as set forth in claim 10 further comprising additional program instructions for causing the computer to:

upon receiving an input identifying a data element, perform a search for selectable actions that are performed on said data element in all application programs other than the application program from which the input was received; and provide a selectable set of actions that are performed on said data element.

\* \* \* \* \*